United States Patent
Konishi et al.

(10) Patent No.: US 6,789,174 B2
(45) Date of Patent: Sep. 7, 2004

(54) MEMORY ACCESS DEVICE ALLOWING SIMULTANEOUS ACCESS

(75) Inventors: Masayuki Konishi, Tokyo (JP); Takehiko Shimomura, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 7 days.

(21) Appl. No.: 09/983,481

(22) Filed: Oct. 24, 2001

(65) Prior Publication Data

US 2002/0184454 A1 Dec. 5, 2002

(30) Foreign Application Priority Data

May 31, 2001 (JP) ........................................ 2001-165013

(51) Int. Cl.[7] .............................................. G06F 13/00
(52) U.S. Cl. ...................... 711/150; 711/154; 711/163; 711/168; 711/170
(58) Field of Search ............................... 711/150, 154, 711/163, 168, 170

(56) References Cited

U.S. PATENT DOCUMENTS

| | | | | |
|---|---|---|---|---|
| 4,236,206 A | * | 11/1980 | Strecker et al. | ............. 712/204 |
| 4,851,991 A | * | 7/1989 | Rubinfeld et al. | ............. 711/5 |
| 5,483,640 A | * | 1/1996 | Isfeld et al. | ................ 709/213 |
| 5,615,331 A | * | 3/1997 | Toorians et al. | ............... 714/9 |
| 6,185,731 B1 | * | 2/2001 | Maeda et al. | ............... 717/128 |
| 6,256,256 B1 | * | 7/2001 | Rao | ..................... 365/230.05 |
| 6,321,331 B1 | * | 11/2001 | Roy et al. | ................... 712/244 |

FOREIGN PATENT DOCUMENTS

JP 10-312355 11/1998

* cited by examiner

Primary Examiner—Reba I. Elmore
(74) Attorney, Agent, or Firm—Leydig, Voit & Mayer, Ltd.

(57) ABSTRACT

In a memory access device, a memory address space of a Random Access Memory (RAM) is divided into blocks BK0 to BKn having continuous address areas. Address buses and data buses of a Central Processing Unit (CPU) and a Real Time Debugger (RTD) are connected to each of the blocks BK0 to BKn. The memory access control circuit checks whether memory blocks accessed by the CPU and the RTD are the same. The memory access control circuit permits simultaneous access by the CPU and the RTD to the memory blocks when the memory block accessed by the CPU and the RTD are not same.

4 Claims, 9 Drawing Sheets

MEMORY ACCESS DEVICE ALLOWING SIMULTANEOUS ACCESS

FIELD OF THE INVENTION

A single chip microcomputer or an MCU (Micro Controller Unit) comprises a CPU as a first function device and an RTD (Real Time Debugger) or a DMA (Direct Memory Access) as a second function device, both of which can access a memory (RAM). The present invention relates to a memory access device in which both the first and second function devices can access the memory at the same time.

BACKGROUND OF THE INVENTION

In a single chip microcomputer or an MCU used for control of various types of industrial equipment and consumer products, including control of an automobile engine, an RTD, other than a CPU, a memory (RAM), and various kinds of peripheral devices have been built in and read/write of the built-in memory has been configured to be performed through a serial input/output interface of a clock synchronization type, without stopping the CPU. The RTD can perform RAM access in the case of no RAM access from the CPU, as the above RTD is connected to the RAM using a dedicated bus.

In such a single chip microcomputer with a built-in RTD, the CPU has been usually configured to have top priority for acquisition of a right of access in the case of simultaneous accesses to the memory (RAM) from the CPU and the RTD, and a so-called cycle stealing method, which access from the RTD may be realized just after completion of the access from the CPU, has been used. That is, a request signal for access to the RAM from the RTD has been conventionally generated just after completion of access from the CPU, as shown by the bottom two lines in FIG. 11, when there are simultaneous accesses to the RAM from the CPU and the RTD, as shown by top two lines in FIG. 11.

Therefore, the access to the RAM from the RTD has been conventionally delayed for a long time, when access from the CPU to the RAM is frequently and continuously generated. That is, when access from the CPU to the RAM is continuously generated for a long time, as shown in FIG. 12, the access from the RTD has been executed after completion of the access from the CPU, even if the access from the RTD to the RAM is generated during the access from the CPU.

Such a phenomenon is similarly generated too whan the DMA is built in as a device accessible to the memory.

In the Japanese Patent Application Laid-Open No. 10-312355 discloses a system in which both a CPU and a DMA are accessible to a RAM, and an RMA storage area is divided into two memory blocks consisting of an upper half word block and lower half word block; the CPU alternately accesses these two memory blocks at a predetermined cycle; and the DMA alternately has, at the same cycle as that of the CPU, an access to a memory block, to which the CPU is not having an access, among the two blocks. That is, the above conventional technology has required two cycles, when the CPU or the DMA accesses one word consisting of an upper half and a lower half of the word.

There is a problem in the above conventional technology that access to one word requires two access cycles, as the simultaneous accesses to the RAM from both the CPU and the DMA may be realized by division of a data area (word) in the RAM storage area into two pieces, an upper half and a lower half of the word, and by a manner in which the CPU and the DMA accesses respectively a word area (upper half word area, or lower half word area) which the other side is not accessing. There is also another problem that the circuit structure becomes complex and the scale of the structure becomes large, since access for one word requires two access cycles in the structure, and a first multiplexer for switching selection between the CPU address bus and the DMA address bus is required at the input side of the RAM, and a second multiplexer for synthesizing the upper half word data and the lower half word data is provided at the output side of the RAM.

SUMMARY OF THE INVENTION

It is an object of this invention to obtain a memory access device in which simultaneous accesses to a memory from a CPU and other function devices may be realized by a simple circuit structure and at the same time access to data of one word in the memory may be realized at one time access in a single chip microcomputer comprising a function device, other than the CPU, such as an RTD or a DMA accessible to the memory.

The memory access device according to the present invention comprises a CPU as a first function device and a desired second function device. Address buses and data buses of the first and second function devices are connected to a memory. Moreover, a memory address space in the memory is divided into a plurality of blocks so that each block has continuous address areas. There is further provided a memory access control unit which checks whether memory blocks accessed by the first and second function devices are same. The memory access control unit permits simultaneous access by the first and second function devices to the memory blocks when the memory block accessed by the first and second function devices are not same.

According to the present invention, the memory address space is divided into a plurality of blocks so that each block has a continuous address area, and address buses and data buses of the CPU and the second function device (RTD, DMA, and so on) are connected to each of the above divided blocks. And, in the memory access control circuit, simultaneous accesses to the memory from the first and second function devices is configured to be permitted when the memory block accessed by the CPU and the memory block accessed by the second function device are judged and the above blocks are different each other.

Other objects and features of this invention will become apparent from the following description with reference to the accompanying drawings.

DESCRIPTION OF THE PREFERRED EMBODIMENTS

Embodiments of a memory access device according to the present invention will be described in detail while referring to the accompanying drawings.

Figure 1:
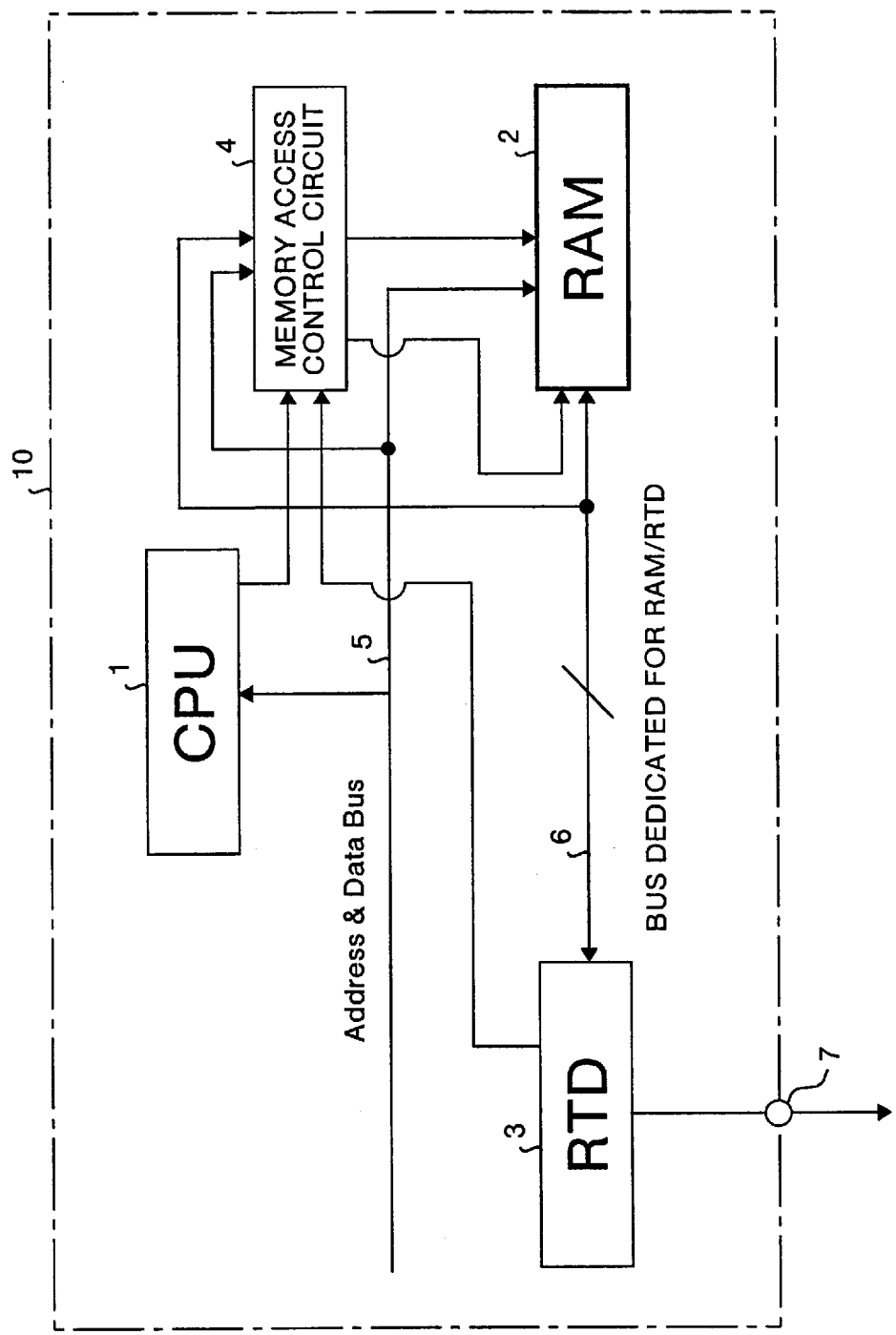
FIG. 1 is a block diagram showing a configuration of a first embodiment for a memory access device according to the present invention.

FIG. 1 shows a conceptual view of an internal configuration of a single chip microcomputer 10. The CPU 1, memory (RAM) 2, RTD 3, and the memory access control circuit 4 are built in the single chip microcomputer 10. Other peripheral devices have not been shown in this drawing for simplicity. The CPU 1 is connected to the memory 2 through a CPU address data bus 5 controlled by the CPU. The RTD 3 is connected to the memory 2 through a RTD address data bus 6 dedicated for the RTD. The RTD 3 comprises an external debugger (an emulator, but not shown), and an external terminal 7 of plural bits for input/output of data. A control bus is eliminated in the drawing.

Memory access requests from both the CPU 1 and from the RTD3 are input to the memory access control circuit 4. The memory access control circuit 4 executes, based on the above input signals, memory access control such as access to the memory 2 from the CPU 1 and the RTD 3 after selection of the both or any one of the CPU address data bus 5 and the address data bus 6 dedicated only for the RTD.

Figure 2:
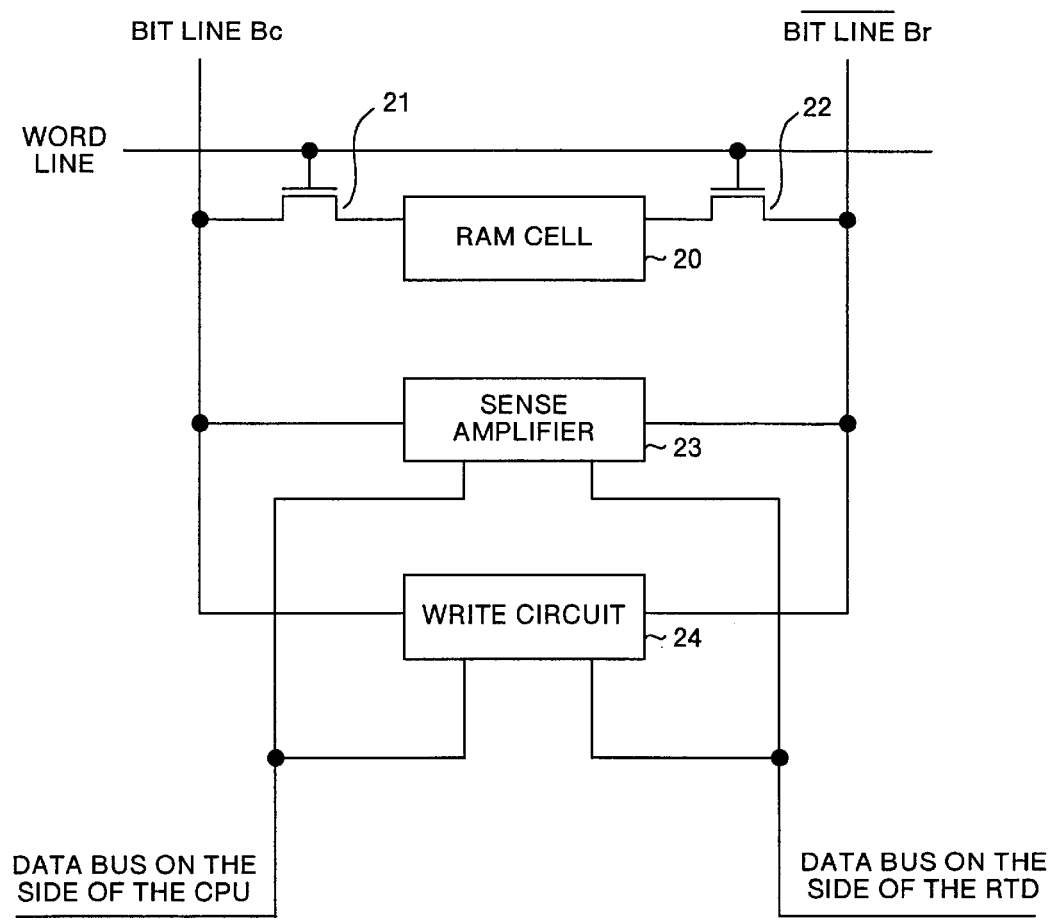
FIG. 2 is a circuit diagram showing a circuit configuration of a memory cell applying the present invention.

FIG. 2 shows an internal configuration of a memory applied to the present invention. In such a case, a RAM cell 20 for one bit is shown. The RAM cell 20 as a capacitor is connected to a pair of MOSFET (Metal Oxide Semiconductor Field Effect Transistor) 21, 22. The MOSFET 21 is connected to a bit line Bc on the side of the CPU 1, and the MOSFET 22 to a bit line Br on the side of the RTD 3. Gates of each MOSFET 21, 22 are connected to the word line.

A sense amplifier 23 under common connection to the bit lines Bc, Br is a circuit for amplification of voltage read out from the RAM cell 20 to the bit line Bc, or Br. The sense amplifier 23 sends out a voltage signal read out from the bit line Bc to the CPU data bus 5 in the case of access from the side of the CPU and a voltage signal read out from the bit line Br to the RTD data bus 6 in the case of access from the side of the RTD 3. A write circuit 24 under common connection to the bit lines Bc, Br outputs written data from the CPU 1 or the RTD 3 to the bit line Bc or Br for writing of the written data into the selected word line. In the above memory 2, one of the above buses is not under control of the CPU 1, different from a usual, so-called dual port RAM in which both of the buses is under control of the CPU 1.

Figure 3:
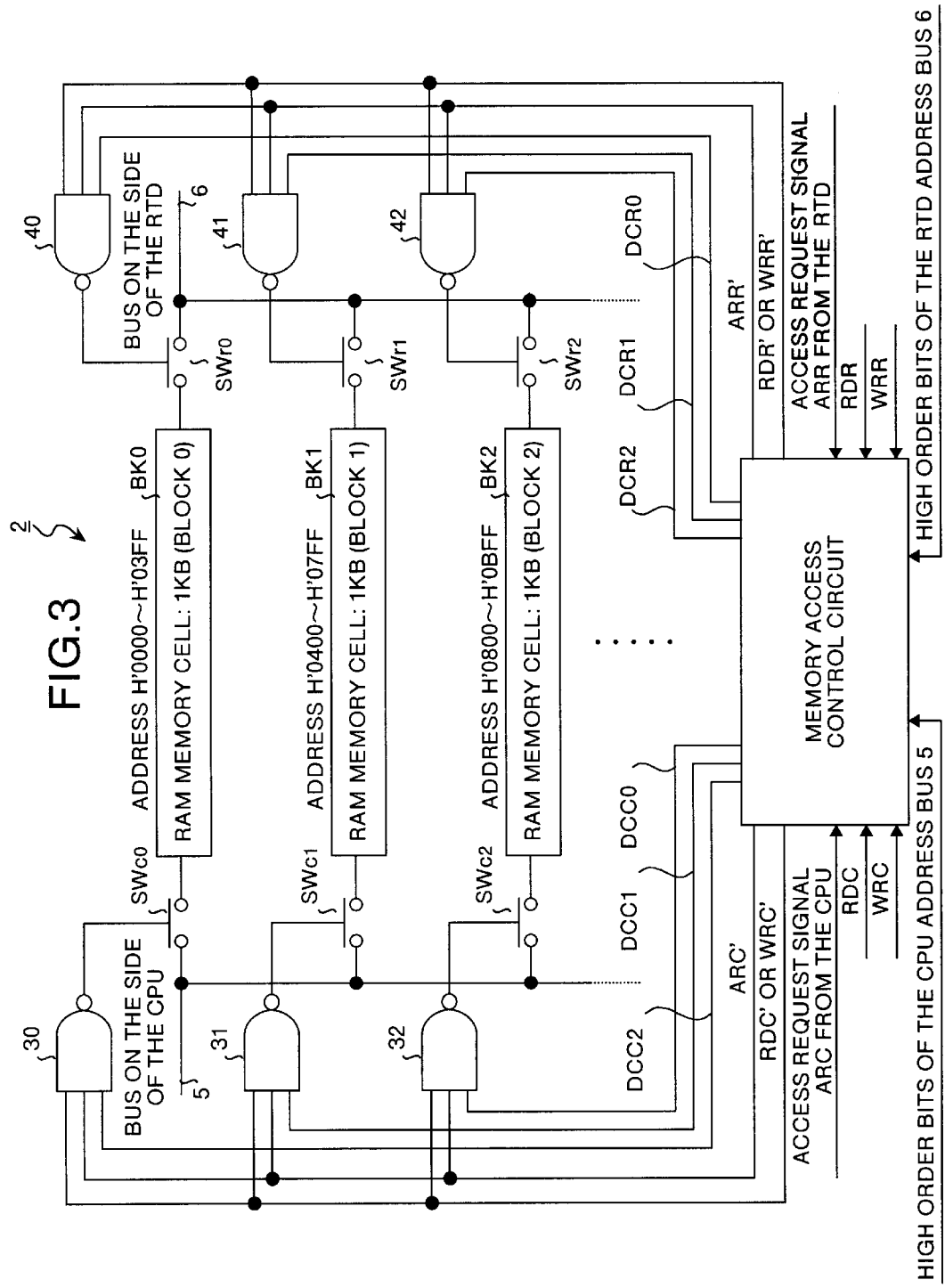
FIG. 3 is a view showing a memory divided into blocks and a bus connection form.

FIG. 3 shows a conceptual view of an internal configuration of the memory 2 and a bus connection form to the memory 2.

In the memory 2, the memory address space is divided into a plurality of blocks BK0 to BKn so that each block has continuous address areas, and the CPU address data bus 5 and the RTD dedicated address data bus 6 are connected to each block BK0 to BKn, respectively, through switch circuits SWc0–SWcn and SWr0–SWrn such as transfer gates. In many cases, a RAM memory cell usually forms one block in a unit of 4 KB, 8 KB, or 16 KB, but, in the first embodiment, the one block is set as a small block in a unit of one KB, and 4 blocks are arranged if the RAM memory cell is of 4 KB; 8 blocks are done if it is of 8 KB; and 16 blocks are done if it is of 16 KB.

The switch circuits on the side of the CPU 1 SWc0-SWcn perform connection switching between the CPU address data bus 5 and each memory block BK0 to BKn by outputs of gate circuits 30–3n, respectively. The switch circuits on the side of the RTD 3 SWr0–SWrn perform connection switching between the RTD dedicated address data bus 5 and each memory block BK0 to BKn by outputs of gate circuits 40–4n, respectively.

The gate circuit 30 performs NAND operation of a CPU access request signal ARC' output from the memory access control circuit 4; a CPU read signal RDC' or a CPU write signal WRC'; and a decoding signal DCC0, and the above NAND output is output to the switching circuit SWc0. The gate circuit 31 performs NAND operation of a CPU access request signal ARC' output from the memory access control circuit 4; a CPU read signal RDC' or a CPU write signal WRC'; and a decoding signal DCC1, and the above NAND output is output to the switching circuit SWc1. The gate circuit 32 performs NAND operation of a CPU access request signal ARC' output from the memory access control circuit 4; a CPU read signal RDC' or a CPU write signal WRC'; and a decoding signal DCC2, and the above NAND output is output to the switching circuit SWc2.

The gate circuit 40 performs NAND operation of an RTD access request signal ARR' output from the memory access control circuit 4; a RTD read signal RDR' or a RTD write signal WRR'; and a decoding signal DCR0, and the above NAND output is output to the switching circuit SWr0. The gate circuit 41 performs NAND operation of a RTD access request signal ARR' output from the memory access control circuit 4; a RTD read signal RDR' or a RTD write signal WRR'; and a decoding signal DCR1, and the above NAND output is output to the switching circuit SWr1. The gate circuit 42 performs NAND operation of a RTD access request signal ARR' output from the memory access control circuit 4; a RTD read signal RDR' or a RTD write signal WRR'; and a decoding signal DCR2, and the above NAND output is output to the switching circuit SWr 2.

An access request signal ARC, a memory read signal RDC, a memory write signal WRC, and the high order bits of the CPU address bus 5 are input to the memory access control circuit 4 as a signal from the side of the CPU 1. And an access request signal ARR, a memory read signal RDR, a memory write signal WRR, and the high order bits of the RTD address bus 6 are input to the memory access control circuit 4 as a signal from the side of the RTD 3.

The memory access control circuit 4 permits simultaneous accesses to the memory 2 by the CPU 1 and the RTD 3, according to the following conditions, in the first embodiment.

Figure 4:
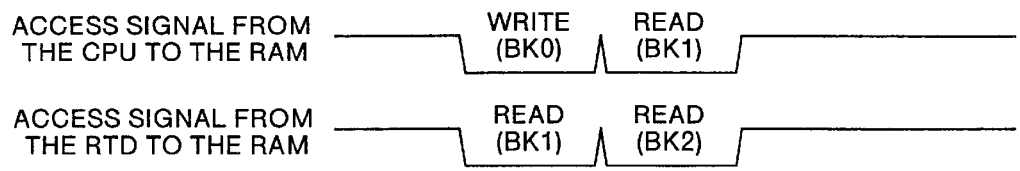
FIG. 4 is a time chart showing an example of memory access operation according to the first embodiment of the present invention.

(A) When it is judged whether a memory block accessed from the CPU 1 and a memory block accessed from the RTD 3 are in accordance with each other, and it is found that the above blocks are different blocks each other, the simultaneous accesses from the CPU 1 and the RTD 3 to the memory 2 are permitted. That is, when the accessed memory blocks are different, the simultaneous accesses from the CPU 1 and the RTD 3 to the memory 2 are permitted, even if the accesses from the CPU 1 and the RTD 3 are either in a read (R) state or in a write (W) state as shown in FIG. 4.

Figure 5:
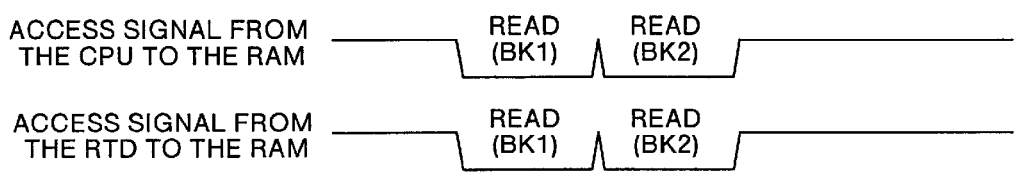
FIG. 5 is a time chart showing an example of memory access operation according to the first embodiment of the present invention.
Figure 6:
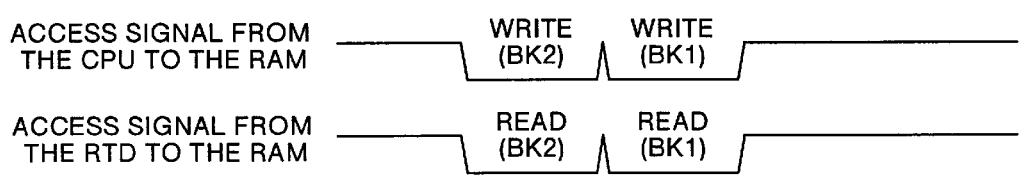
FIG. 6 is a time chart showing an example of memory access operation according to the first embodiment of the present invention.

(B) If the same block is simultaneously assigned from the CPU 1 and the RTD 3, the simultaneous accesses from the CPU 1 and the RTD 3 to the memory 2 are permitted, when the accesses from the both sides are in a read (R) state of the memory, and when the access from one side is in a read (R) state, and that from the other side in a write (W) state, as shown in FIG. 5 and FIG. 6.

In this first embodiment, it is configured that the CPU 1 has a priority for right of access in a similar manner to that of a conventional technology and the access from the RTD 3 may be realized just after completion of the access from the CPU 1, when the same block is simultaneously assigned from the CPU 1 and the RTD 3 and the accesses from the both sides is in a write (W) state.

In the memory access control circuit 4, decoding signals DCC0–DCCn, on the side of the CPU 1, for assigning one block among the memory blocks BK0 to BKn are formed by decoding of the high order bits of the CPU address bus 5, and the above decoding signals DCC0–DCCn are output to each gate circuit 30–3n. And, decoding signals DCR0–DCRn, on the side of the RTD 3, for assigning one block among the memory blocks BK0 to BKn are formed by decoding of the high order bits of the RTD address bus 6, and the above decoding signals DCRO-DCRn are output to each gate circuit 40–4n.

If the access request signal ARC from the CPU 1 and the access request signal ARR from the RTD 3 are simultaneously input in order to execute the control of the above item (A), the memory access control circuit 4 outputs the CPU access request signal ARC' and, at the same time, the RTD access request signal ARR', and also the CPU read signal RDC', or the CPU write signal WRC', and the RTD read signal RDR', or the RTD write signal WRR', are simultaneously output at a predetermined timing, when it is judged by decoding of the high order bits of the CPU address bus 5, and those of the RTD address bus 6, whether a memory block accessed from the CPU 1 and a memory block accessed from the RTD 3 are in accordance with each other, and it is found that the above blocks are different blocks each other. Moreover, the decoding signals DCC0–DCCn on the side of the CPU 1 and the decoding signal DCR0–DCRn on the side of the RTD 3 are simultaneously output at a predetermined timing.

By input of the above signals into each gate circuits 30–3n, 40–4n, the simultaneous accesses from the CPU 1 and the RTD 3 are executed to the different two memory blocks selected by the decoding signals as shown in FIG. 4.

If the access request signal ARC from the CPU 1 and the access request signal ARR from the RTD 3 are simultaneously input in order to execute the control of the above item (B), it is judged by decoding of the high order bits of the CPU address bus 5, and those of the RTD address bus 6, whether a memory block accessed from the CPU 1 and a memory block accessed from the RTD 3 are in accordance with each other. If it is judged that the above accesses are performed to the same block, the CPU access request signal ARC' and the RTD access request signal ARR' are simultaneously output, and, at the same time, the CPU read signal RDC', or the CPU write signal WRC', and the RTD read signal RDR', or the RTD write signal WRR', are simultaneously output at a predetermined timing, when it is found that any one of the above conditions are satisfied, after making identification between when the accesses from both of the CPU 1 and RTD 3 in a read (R) state of the memory, and when one access is in a read (R) state and the other write (W) state by judgment of the read signal from the CPU 1 RDC or the write signal WRC, and the read signal from the RTD 3 RDR or the write signal WRR, which are input. Moreover, the decoding signals DCC0–DCCn on the side of the CPU 1 and the decoding signal DCR0–DCRn on the side of the RTD 3 are simultaneously output at a predetermined timing.

By input of the above signals to each gate circuits 30–3n, 40–4n, simultaneous access (R/R or W/R or R/W) from the CPU 1 and the RTD 3 is to the different two memory blocks selected by the decoding signals as shown in FIG. 5 or FIG. 6.

In the memory access control circuit 4, the access from the RTD 3 may be realized under giving priority to the CPU 1 in a similar manner to that of a conventional technology just after completion of the access from the CPU 1, as described above, when the same block is simultaneously assigned from the CPU 1 and the RTD 3 and the accesses from both sides are in a write (W) state.

In the first embodiment, the RTD 3 may have an access to the RAM 2 before completion of access from the CPU 1, and, thereby, read and write of data may be realized without dependence on each other, as described above, as simultaneous accesses from the CPU 1 and the RTD 3 to the memory 2 may be realized when a memory block accessed from the CPU 1 and a memory block accessed from the RTD 3 are different blocks; and, moreover, when the accesses from the both sides are in a read (R) state, and when one access is in a read (R) state, and the other access in a write (W) state in a case where the same block is simultaneously assigned from the CPU1 and the RTD 3. Further, access may be realized without division of data as the address space is divided without conventional division of words (data), and, thereby, simultaneous access from the CPU 1 and the RTD 3 maybe realized with a simple circuit structure.

A second embodiment according to the present invention will be described referring to FIG. 7 to FIG. 9. In the second embodiment, it is configured that the both write data are simultaneously kept in a latched state; write access for the CPU 1 is executed ahead of the RTD 3 by giving priority to the CPU 1; and write access for the RTD 3 is made after completion of write access from the CPU 1, when write on the side of the CPU 1 and the one on the side of the RTD 3 are in contention with each other.

Figure 7:
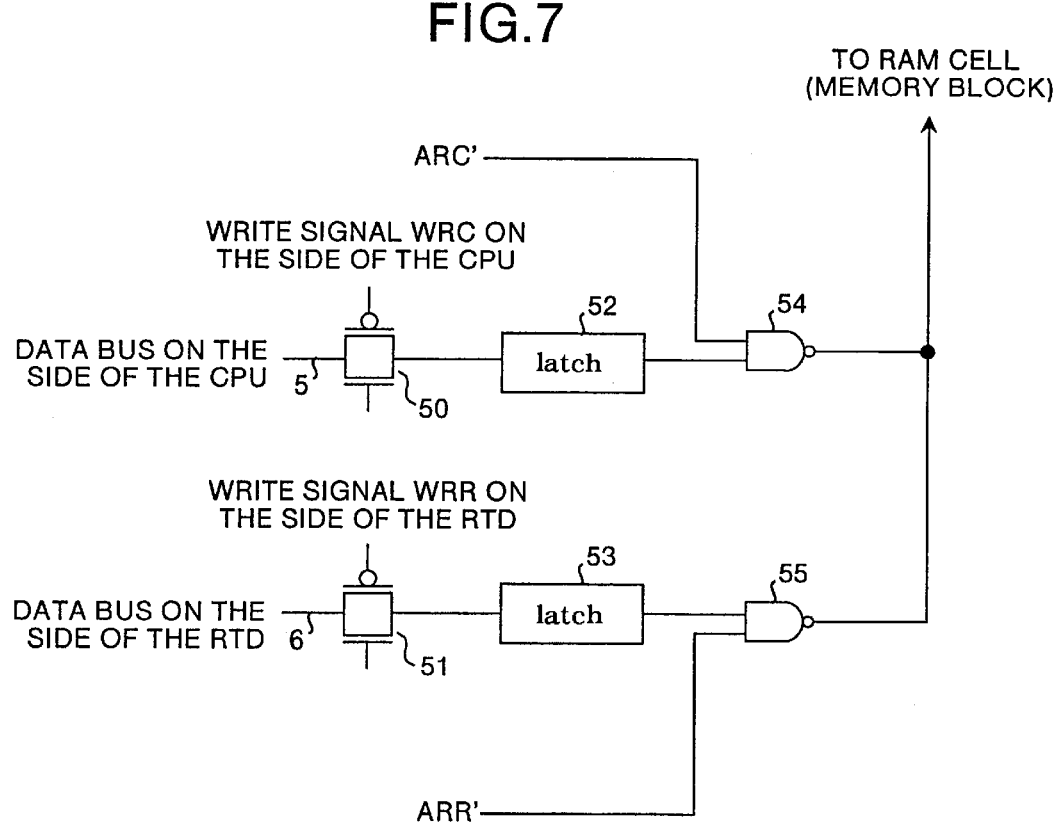
FIG. 7 is a block diagram showing a configuration of a second embodiment for a memory access device according to the present invention.

FIG. 7 is a view showing a configuration for the above description, that is, the CPU data bus 5 is connected to a latch circuit (buffer circuit) 52 through a switching circuit 50 such as a transfer gate. The output of the latch circuit 52 is input to a gate circuit 54, by which NAND operation of the above output and the CPU access request signal ARC' output from the memory access control circuit 4 is performed. The write signal WRC from the CPU 1 is input to the switching circuit 50, by which the switching circuit 50 is made ON to take the data on the CPU data bus 5 into the latch circuit 52.

The RTD 3 data bus 6 is connected to a latch circuit 53 through a switching circuit 51 such as a transfer gate. The output of the latch circuit 53 is input to a gate circuit 55, by which NAND operation of the above output and the RTD access request signal ARR' output from the memory access control circuit 4 is performed. The write signal WRR from the RTD 3 is input to the switching circuit 51, by which the switching circuit 51 is made ON to take the data on the RTD data bus 6 into the latch circuit 53.

Figure 8:
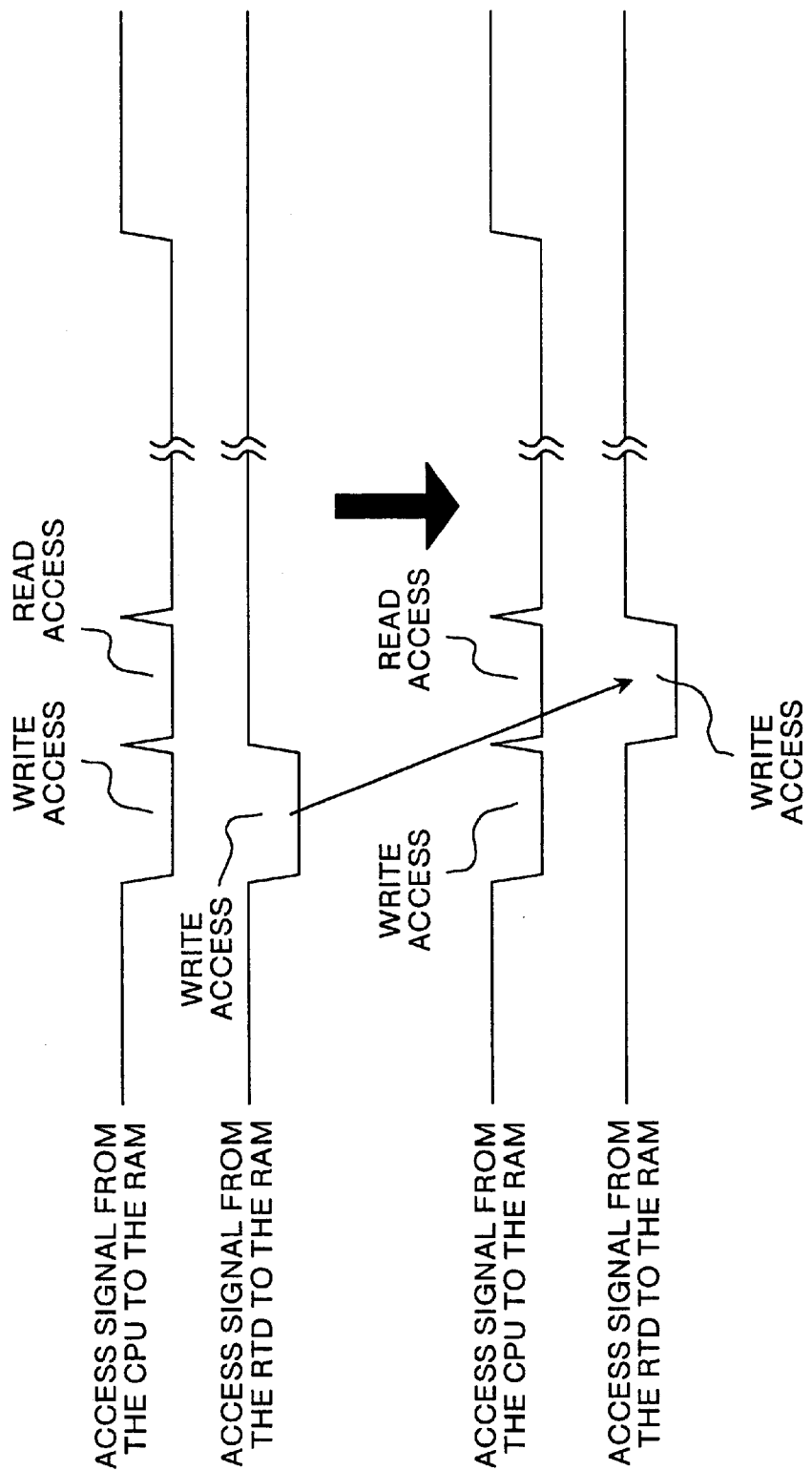
FIG. 8 is a time chart showing an example of memory access operation according to the second embodiment of the present invention.
Figure 9:
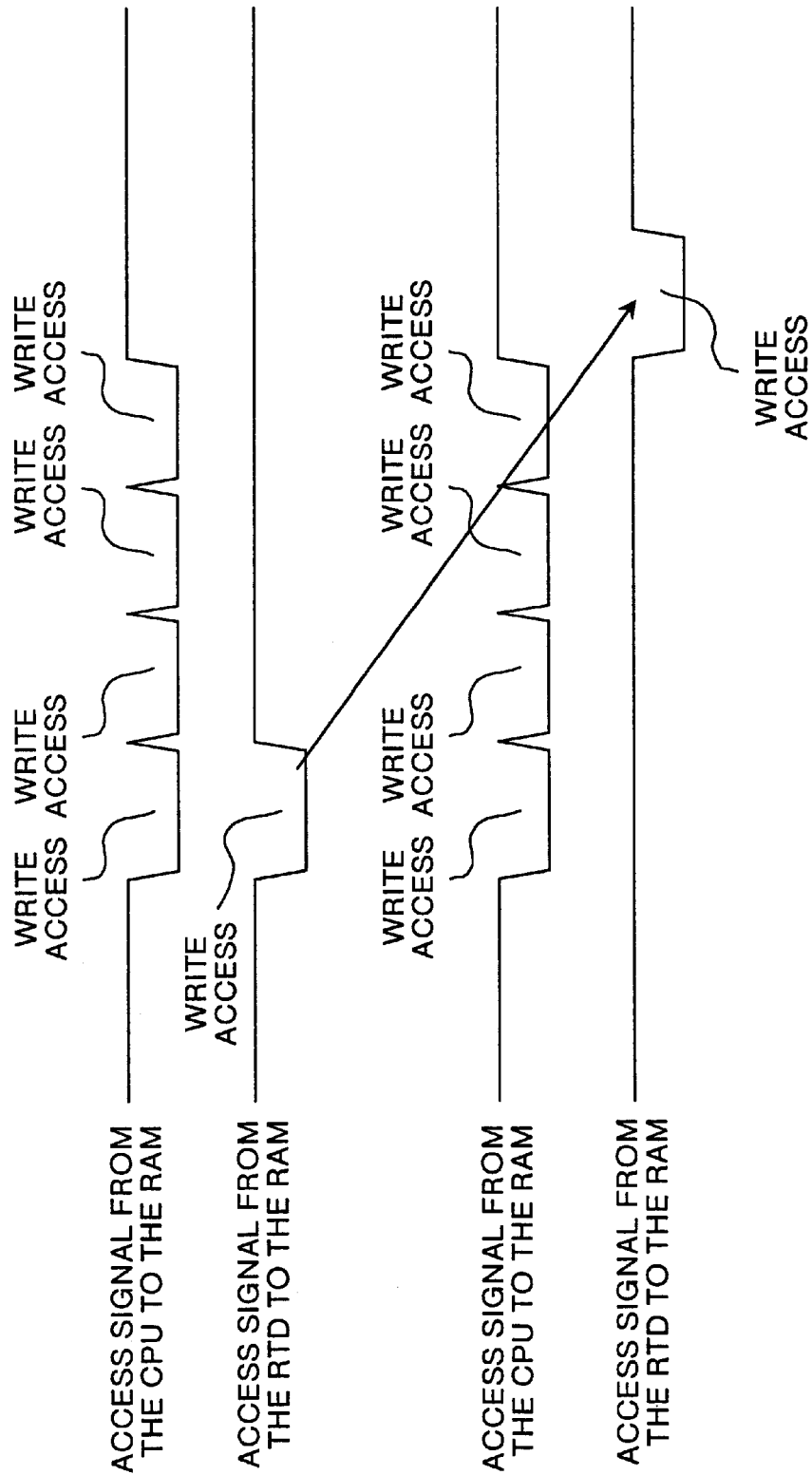
FIG. 9 is a time chart showing an example of memory access operation according to the second embodiment of the present invention.

As the switching circuits 50, 51 are made ON by the write signal WRC from the CPU 1 and the write signal WRR from the RTD 3 according to the above configuration, the above switching circuits 50, 51 are simultaneously made ON when simultaneous write operation into the same block from the CPU 1 and the RTD 3 is generated as shown by top two lines in FIG. 8 and FIG. 9. Therefore, the write data from the CPU 1 are input to the latch circuit 52, and, at the same time, the write data from the RTD 3 are input to the latch circuit 53.

In such a case, the memory access control circuit 4 activates the CPU access request signal ARC', and the CPU memory write signal WRC' for output at a predetermined timing in the first place in order to perform the write operation from the side of the CPU 1, when it is detected, based on the judgment of the above signals such as the access request signal ARC, the memory read signal RDC, the memory write signal WRC, and the high order bits of the CPU address bus 5 from the CPU 1; and the access request signal ARR, the memory read signal RDR, memory write signal WRR, and the high order bits of the RTD address bus 6 from the RTD 3, that the both accesses from the CPU 1 and the RTD 3 are in a write state, and the above accesses are simultaneously performed to the same block. On the other hand, the RTD access request signal ARR' are kept inactive. Thereby, the gate circuit 54 is activated, and the write data from the CPU 1 temporarily stored in the latch circuit 52 are written into a selected memory block by the above decoding signal.

During the above write operation from the CPU 1, the write data from the RTD 3 is temporarily accumulated in the latch circuit 53.

The memory access control circuit 4 activates the RTD access request signal ARR and the RTD memory write signal WRR' for output at a predetermined timing, when completion of access from the CPU 1 is detected by the access request signal ARC from the CPU 1. On the other hand, the CPU access request signal ARC' is made inactive. Thereby, it is configured that the gate circuit 54 becomes inactive; the gate circuit 55 is activated; and the write data from the RTD 3 temporarily stored in the latch circuit 53 on the side of the RTD 3 is written in a memory block (the same block as the one selected by the CPU1) selected by the above decoding signal, as shown by bottom two lines in FIG. 8 and FIG. 9.

As described above, there are provided in the second embodiment the buffer circuits 52, 53 for temporary storage of the written data from the CPU 1 and the RTD 3 when the same memory block is accessed and the both accesses are in a write state; and the written data, which are temporarily stored in the buffer circuit 53 on the side of the RTD 3, from the RTD 3 is written in the memory 2 after completion of write operation from the CPU 1. That is, it is configured that the output timing of the memory access request signal ARR from the side of the RTD, the read signal RDR, the write signal WRR, and so on is not intentionally shifted for the signal from side of the CPU, but the actual write timing of the data from the side of the RTD 3 into the memory 2 is shifted, in the second embodiment. Therefore, simultaneous write operation from the CPU 1 and the RTD 3 to the memory 2 is performed in a quasi-manner, as the own write timing does not depend on the write timing from the CPU 1 from a view point of the side of the RTD 3. Therefore, simultaneous write operation to the memory 2 may be performed in a quasi-manner without adjustment of the memory access timing between the CPU 1 and the RTD 3 so as to avoid collision of accesses.

Figure 10:
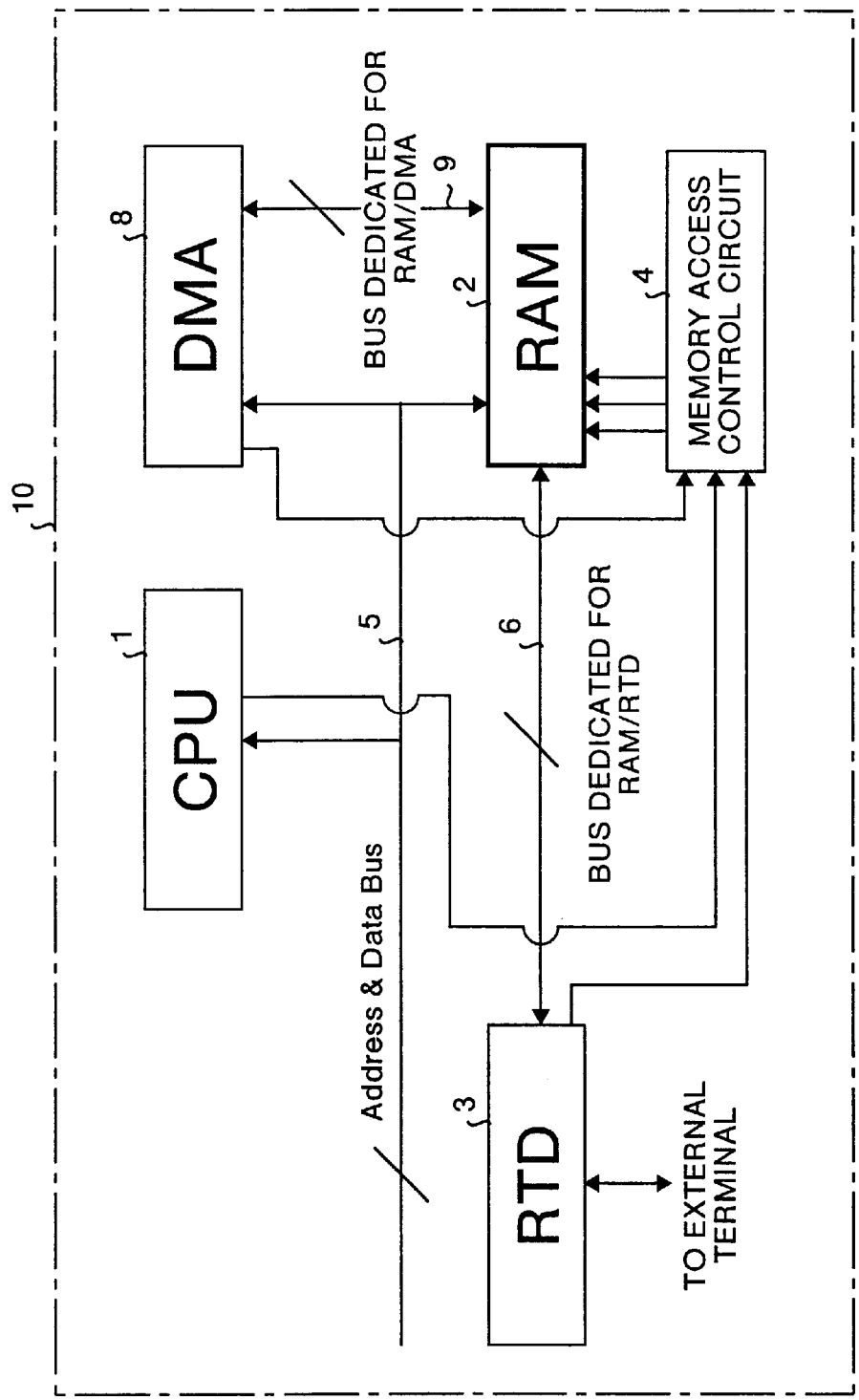
FIG. 10 is a block diagram showing a configuration of a third embodiment for a memory access device according to the present invention.
Figure 11:
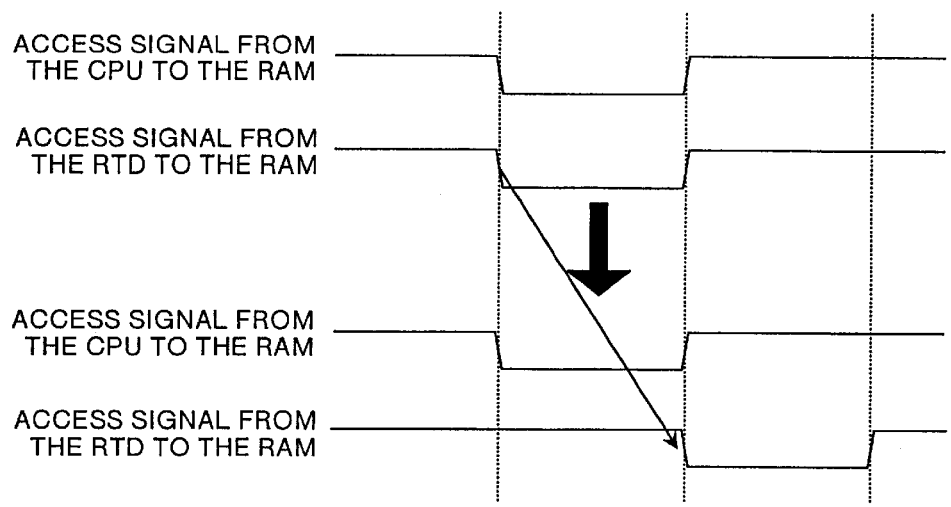
FIG. 11 is a time chart showing a memory access operation according to a conventional technology.
Figure 12:
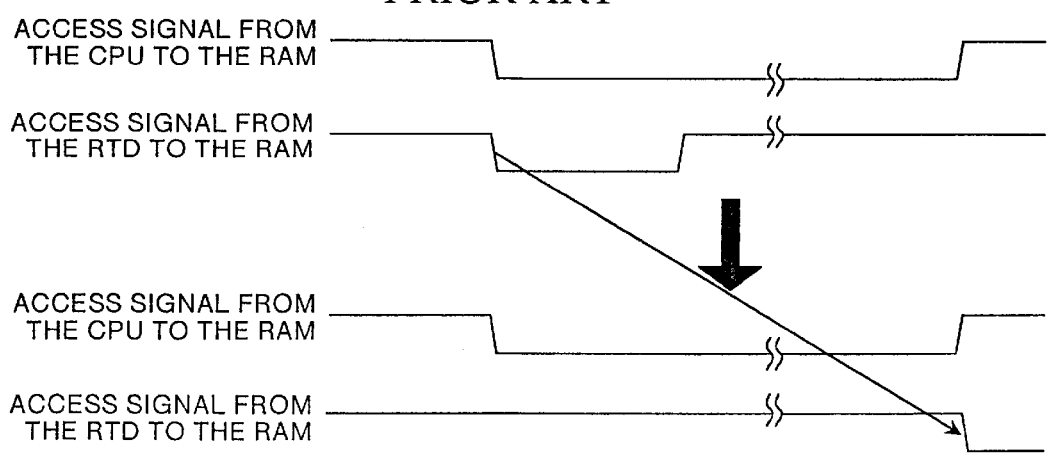
FIG. 12 is a time chart showing a memory access operation according to a conventional technology.

A third embodiment according to the present invention will be described referring to FIG. 10. In the third embodiment, a DMA 8 with a function for data transfer between a peripheral device (serial I/O register) and the memory 2 not through the CPU 1 is configured to be further provided. That is, the DMA 8, like the RTD 3, is also one of function devices accessible to the RAM 2 in a similar manner to that of the CPU1. Simultaneous accesses from the CPU 1 and the RTD 3 to the memory 2 may be performed in the case of the DMA 8 by provision of an address data bus 9 dedicated for the DMA connecting the RAM 2 and the DMA 8, and by a control as described in the above first and second embodiments in a similar manner to that of the RTD 3 in the use of the DMA 8.

As described above, according to the present invention, access may be performed without division of data, as simultaneous accesses from the first and second function devices are configured to be permitted, if the address space of the memory is divided into a plurality of blocks; address buses and data buses of the CPU and the second function device are connected to each of the above divided blocks; and a memory block accessed from the CPU and a memory block accessed from the second function device are different blocks each other. Thereby, simultaneous accesses from the CPU and the second function device may be realized by a simple circuit configuration.

Furthermore, simultaneous accesses from the CPU and the second function device to the same memory block may be realized, as simultaneous accesses from the first and second function devices to the above memory are configured to be permitted when accesses from the both memory blocks are in a read state to the memory and when one access is in a read state and the other access is in a write state, if the same memory block is accessed from the CPU and the second function device.

Moreover, simultaneous write operation to the memory may be realized in a quasi manner without adjustment of the memory access timing between the CPU and the second function device so as to avoid collision of write accesses, as there is provided the buffer circuit for temporary storage of write data from the CPU and the second function device when the same memory block is accessed from the CPU and the second function device and accesses from the both memory blocks are in a write state; and write data from the second function device temporarily stored in the buffer circuit are configured to be written into the memory after completion of write operation from the CPU.

Furthermore, efficient DMA transfer and emulation operation may be realized, as simultaneous accesses from at least one of the RTD and the DMA, other than the CPU, to the memory an be performed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A memory access device comprising:
   a CPU as a first function device;
   one of a real time debugger and a direct memory access device as a second function device;
   a memory to which address buses and data buses of said first and second function devices are connected, wherein memory address space of said memory is divided into a plurality of blocks and each block has continuous address areas; and a memory access control unit which checks whether memory blocks accessed by said first and second function devices are the same, and permits simultaneous access by said first and second function devices to the memory blocks when the memory blocks accessed by said first and second function devices are not the same.

2. The memory access device according to claim 1, wherein said memory access control unit permits simultaneous access by said first and second function devices when the memory blocks accessed by said first and second function devices are the same when (a) the accesses from both of said first and second function devices is a read operation, and (b) the access from one of said first and second function devices is a read operation and the access from the other of said first and second function devices is a write operation.

3. The memory access device according to claim 1, wherein said memory access control unit further comprises a buffer circuit for temporary storage of data, wherein said buffer circuit stores write data from said first and second function devices when the same memory block is accessed by said first and second function devices and the accesses from both of said first and second function devices is a write operation, and write data from said second function device temporarily stored in said buffer circuit are written into said memory after completion of a write operation by said first function device.

4. A memory access device comprising:

a CPU as a first function device;

a second function device;

a memory to which address buses and data buses of said first and second function devices are connected, wherein memory address space of said memory is divided into a plurality of blocks and each block has continuous address areas, said memory comprising a memory cell having a first terminal and a second terminal;

a first bit line connected to said first terminal;

a second bit line connected to said second terminal;

a sense amplifier connected to said first bit line and said second bit line, and amplifying a voltage read out from said memory cell; and a write circuit connected to said first bit line and said second bit line, and outputting written data from one of said first function device and said second function device to said first and second bit lines, respectively, wherein said sense amplifier is connected to a first data bus that is connected to said first function device, and to a second data bus that is connected to said second function device, said write circuit is connected to the first data bus and to the second bus, when said memory cell is accessed from said first function device, the voltage read out from said memory cell is read out through said first bit line to the first data bus, and when said memory cell is accessed from said second function device, the voltage read out from said memory cell is read out through said second bit line to the second data bus and a memory access control unit which checks whether memory blocks accessed by said first and second function devices are the same, and permits simultaneous access by said first and second function devices to the memory blocks when the memory blocks accessed by said first and second function devices are not the same.

* * * * *